US009253690B2

(12) United States Patent
Wan et al.

(10) Patent No.: US 9,253,690 B2
(45) Date of Patent: Feb. 2, 2016

(54) METHOD AND APPARATUS FOR CONTROLLING CELL RESELECTION (71) Applicant: Huawei Device Co.,Ltd., Shenzhen, Guangdong (CN)

(72) Inventors: Jiang Wan, Shanghai (CN); Konggang Wei, Shenzhen (CN)

(73) Assignee: Huawei Device Co.,Ltd, Shenzhen (CN)

( * ) Notice: Subject to any disclaimer, the term of this patent is extended or adjusted under 35 U.S.C. 154(b) by 0 days.

(21) Appl. No.: 14/103,825

(22) Filed: Dec. 11, 2013

(65) Prior Publication Data

US 2014/0099956 A1  Apr. 10, 2014

Related U.S. Application Data (63) Continuation of application No. PCT/CN2012/088029, filed on Dec. 31, 2012.

(30) Foreign Application Priority Data

Feb. 24, 2012 (CN) .......................... 2012 1 0045588

(51) Int. Cl.
*H04W 36/00* (2009.01)
*H04W 48/20* (2009.01)

(52) U.S. Cl.
CPC ...... *H04W 36/0061* (2013.01); *H04W 36/0083* (2013.01); *H04W 48/20* (2013.01)

(58) Field of Classification Search
USPC ............. 455/67.11, 524, 424, 101, 446, 41.2, 455/452.2, 686.6, 63.1, 522, 562
See application file for complete search history.

(56) References Cited

U.S. PATENT DOCUMENTS

| 2006/0034228 | A1 | 2/2006 | Kim et al. |
| 2006/0217115 | A1* | 9/2006 | Cassett et al. ................. 455/423 |
| 2007/0123258 | A1 | 5/2007 | Sawyer |
| 2008/0286400 | A1* | 11/2008 | Morrill et al. ................. 425/424 |
| 2009/0135759 | A1 | 5/2009 | Hirano et al. |
| 2009/0143016 | A1* | 6/2009 | Li ................................ 455/63.1 |
| 2009/0310562 | A1 | 12/2009 | Medapalli |
| 2009/0318140 | A1* | 12/2009 | Gamel et al. ............... 455/432.1 |
| 2010/0309887 | A1* | 12/2010 | Kim et al. ..................... 370/332 |
| 2011/0177819 | A1 | 7/2011 | Kitahara |

(Continued)

FOREIGN PATENT DOCUMENTS

| CN | 1725901 A | 1/2006 |
| CN | 1964551 A | 5/2007 |

(Continued)

*Primary Examiner* — Joseph Arevalo
(74) *Attorney, Agent, or Firm* — Huawei Technologies Co., Ltd (57) ABSTRACT Embodiments of the present application provide a method and an apparatus for controlling cell reselection, which relate to the field of communication terminal technologies. The method includes: when the signal strength of a current serving cell of a terminal is lower than a set value and the duration of which exceeds a first time period, acquiring signal strengths of the current serving cell and a neighboring cell within a second time period; determining signal stability of the current serving cell according to the signal strength of the current serving cell, and determining signal stability of the neighboring cell according to a signal strength of the neighboring cell; and keep the current serving cell when the signal stability of the neighboring cell is not better than the signal stability of the current serving cell. The embodiments of the present application are mainly applied to a cell reselection process.

23 Claims, 4 Drawing Sheets (56) References Cited

U.S. PATENT DOCUMENTS

2012/0015685 A1  1/2012  Kago et al.
2012/0202556 A1  8/2012  Mori

FOREIGN PATENT DOCUMENTS

| CN | 101895966 A | 11/2010 |
|---|---|---|
| CN | 102111804 A | 6/2011 |
| EP | 1492372 A2 | 12/2004 |
| JP | 09219697 A | 8/1997 |
| JP | 2009508363 A | 2/2009 |
| JP | 2009188983 A | 8/2009 |
| JP | 2010050898 A | 3/2010 |
| JP | 2010081543 A | 4/2010 |
| JP | 2010219997 A | 9/2010 |
| JP | 2012028831 A | 2/2012 |
| WO | 2007029881 A2 | 3/2007 |
| WO | 2011070643 A1 | 6/2011 |

* cited by examiner

FIG. 5

METHOD AND APPARATUS FOR CONTROLLING CELL RESELECTION

CROSS-REFERENCE TO RELATED APPLICATIONS

This application is a continuation of International Application No. PCT/CN2012/088029, filed on Dec. 31, 2012, which claims priority to Chinese Patent Application No. 201210045588.3, filed on Feb. 24, 2012, both of which are hereby incorporated by reference in their entireties.

TECHNICAL FIELD

The present application relates to the field of telecommunication terminal technologies, and in particular, to a method and an apparatus for controlling cell reselection.

BACKGROUND

A modem (modulator-demodulator) or a device having a modem (collectively referred to as a "modem" hereinafter) is a part of a mobile communication device. Examples of the mobile communication device include mobile phones, data cards, and tablet computers.

A mobile communication device is capable of being served by a cell of a cellular communication network. When a cell is currently serving a mobile communication device, the cell is called a current serving cell of the mobile communication device. In an area where signals of the current serving cell (referred to as a "current cell" hereinafter) are weak and unstable (such area is called a "weak field" hereinafter), parameters such as signal strength and signal quality of the current cell may have little difference from those of neighboring, non-serving cells. When the modem is standby in the weak field, signal quality factor of the current cell is poor because signals are brief and unstable. When the signal quality factor of a neighboring cell, obtained by using an R algorithm, is better than the signal quality factor of the current cell, the modem performs a cell reselection operation to change the serving cell from the current cell to the neighboring cell. However, the signal quality factor of the neighboring call might also be poor. Due to the instability of signals in the weak field, the modem needs to perform cell reselection repeatedly, so as to ensure that the serving cell is a cell with an optimal signal quality factor. However, such repeated cell reselection increases standby power consumption, and reduces standby time of the modem.

SUMMARY

Embodiments of the present application provide a method and an apparatus for controlling cell reselection, so as to avoid meaningless cell reselections in a weak field situation, and reduce power consumption of a communication device.

In order to achieve the foregoing objectives, the present application adopts the following technical solutions.

A method for controlling cell reselection in a cellular communication network is provided. The method includes:

monitoring, by a communication device, signal strength of a current serving cell;

when the signal strength of the current serving cell has been lower than a threshold value for longer than a first time period, acquiring, by the communication device, signal strengths of the current serving cell and at least one neighboring cell in a second time period;

determining, by the communication device, signal stability of the current serving cell according to the signal strength of the current serving cell, and signal stability of the neighboring cell according to the signal strength of the neighboring cell; and if the signal stability of the neighboring cell is better than the signal stability of the current serving cell, reselecting, by the communication device, the neighboring cell as a serving cell.

An apparatus for controlling cell reselection in a cellular communication network is provided, the apparatus includes:

a signal strength measuring unit, configured to monitor signal strength of a current serving cell, and, when signal strength of the current serving cell is lower than a threshold value for longer than a first time period, acquire signal strengths of the current serving cell and at least one neighboring cell in a second time period;

a signal stability determining unit, configured to determine signal stability of the current serving cell according to the signal strength of the current serving cell, and determine signal stability of the neighboring cell according to the signal strength of the neighboring cell; and a cell reselection control unit, configured to reselect the neighboring cell as a serving cell when the signal stability of the neighboring cell is better than the signal stability of the current serving cell.

A terminal device capable of communicating with a cellular communication network is provided, the terminal includes an apparatus for selecting a serving cell, wherein the apparatus includes:

a signal monitor, configured to monitor signal strength of a current serving cell, and, when the signal strength of the current serving cell is lower than a threshold value for longer than a first time period, acquire signal strengths of the current serving cell and at least one neighboring cell in a second time period; and a signal processor, configured to determine signal stability of the current serving cell and signal stability of the neighboring cell according, respectively, to the signal strength of the current serving cell and the signal strength of the neighboring cell, and reselect the neighboring cell as a serving cell when the signal stability of the neighboring cell is better than the signal stability of the current serving cell.

Through the embodiments of the present application, the aforementioned unnecessary cell reselection problem in the prior art can be avoided. The communication device can camp on a stable serving cell, and eliminate meaningless cell reselection, standby power consumption of the communication device can be reduced, and standby time of the communication device can be prolonged.

DESCRIPTION OF EMBODIMENTS

A method and an apparatus for controlling cell reselection in the embodiments of the present application are described in detail below with reference to the accompanying drawings.

Embodiment 1

Figure 1:
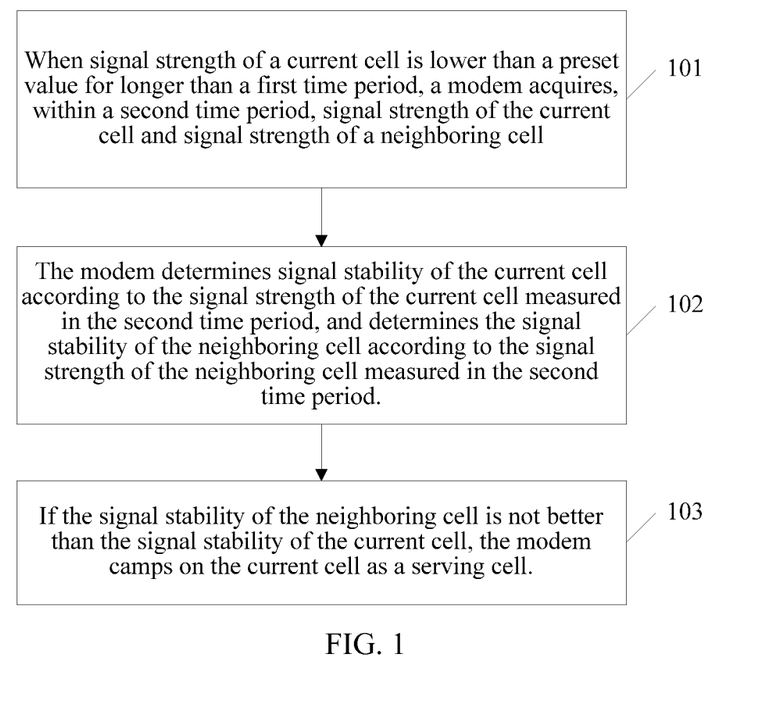
FIG. 1 is a flow chart of a method for controlling cell reselection according to Embodiment 1 of the present application.

A method for controlling cell reselection provided in this embodiment of the application is shown in FIG. 1, and includes the following:

101: When signal strength of a current cell is lower than a preset value for longer than a first time period, a modem acquires, within a second time period, signal strength of the current cell and signal strength of a neighboring cell. The first time period may be a short time period after the signal strength of the current cell being lower than the preset value. This may correspond to a scenario in which the signal strength of the current cell has just changed from a stronger signal to a weak signal that is below the preset value.

102: The modem determines signal stability of the current cell according to the signal strength of the current cell measured in the second time period, and determines the signal stability of the neighboring cell according to the signal strength of the neighboring cell measured in the second time period.

103: If the signal stability of the neighboring cell is not better than the signal stability of the current cell, the modem camps on the current cell as a serving cell.

The second time period is a time period after the end of the first time period, and is independent from the first time period.

The signal strength may be represented by a signal power.

In a specific example, the preset value for the signal strength may be −95 dbm. If the modem detects that the signal strength of the current cell is lower than −95 dbm, and the duration of the low signal strength exceeds a preset time period, the modem starts to perform a network search, so as to acquire the signal strengths of the current cell and the neighboring cell. Signal stabilities of the current cell and one or more neighboring cells are calculated, and a most stable cell is selected for the modem to camp on.

The signal stability can be represented by a signal stability value. The signal stability value of the current cell is determined according to the following equation:

$$Q'_{var} = \frac{\sum_{n=1}^{N} |q_n - Q_{avg}|}{N} \quad (1)$$

where $Q'_{var}$ is the signal stability value of the current cell, $q_n$ is a signal strength of the current cell that is acquired at the $n^{th}$ time point within the second time period, $Q_{avg}$ is an average of signal strengths of the current cell that are acquired at N time points within the second time period, N is the number of times when the signal strength of the current cell is acquired within the second time period, and N is greater than or equal to 2 (This requirement applies to the following embodiments as well).

The signal stability value of the neighboring cell is determined according to the following equation:

$$Q_r = \frac{\sum_{n=1}^{N} |w_n - Q_a|}{N} \quad (2)$$

where $Q_r$ is the signal stability value of the neighboring cell, $w_n$ is a signal strength of the neighboring cell that is acquired at the $n^{th}$ time point within the second time period, $Q_a$ is an average of signal strengths of the neighboring cell that are acquired at N time points within the second time period, and N is the number of times when the signal strength of the neighboring cell is acquired within the second time period.

Because the above signal stability value of the current cell and the signal stability value of the neighboring cell are obtained according to a variance formula, the smaller the variance value, the better the signal stability. Therefore, when the signal stability value of the neighboring cell is not less than the signal stability value of the current cell (i.e. the signal stability of the neighboring cell is not better than the signal stability of the current cell), the current cell is maintained as the serving cell. Furthermore, when there is only one neighboring cell, and when the signal stability value of the neighboring cell is not less than the signal stability value of the current cell, the current cell is kept as the serving cell; or when there are at least two neighboring cells, and when the minimum signal stability value (i.e. the most stable neighboring cell) among signal stability values of the neighboring cells is not less than the signal stability value of the current cell, the current cell is kept as the serving cell.

Figure 2:
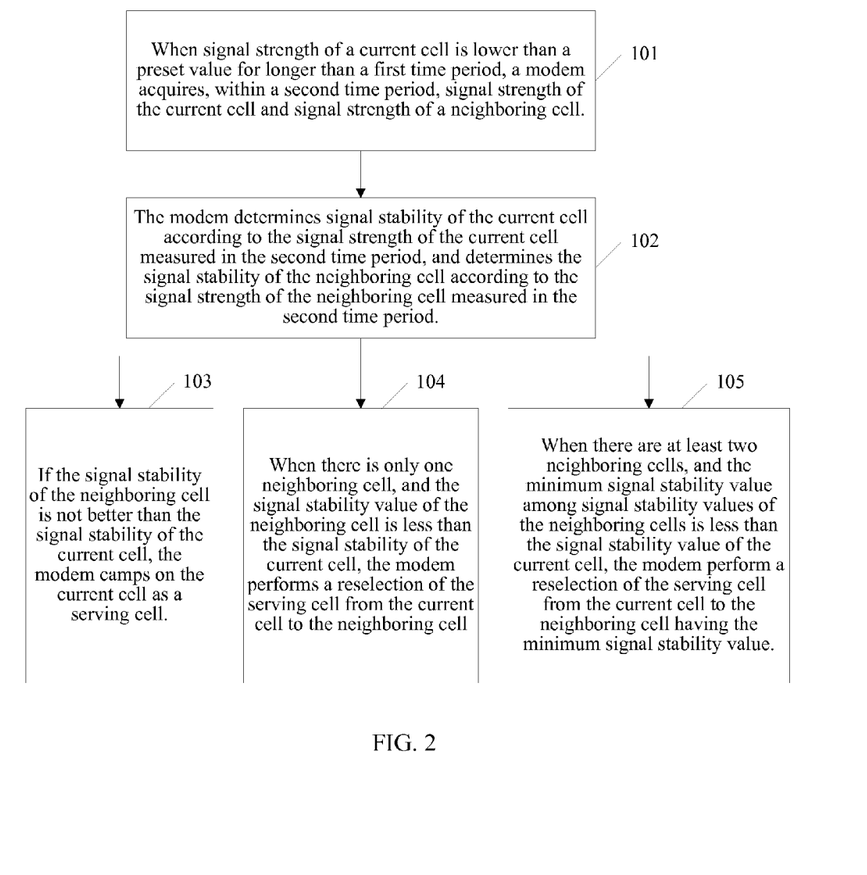
FIG. 2 is another flow chart of the method for controlling cell reselection according to Embodiment 1 of the present application.

As shown in FIG. 2, when the signal stability of a neighboring cell is better than the signal stability of the current cell, the neighboring cell is selected as the serving cell. Specifically, the following two situations are considered.

104: When there is only one neighboring cell, and the signal stability value of the neighboring cell is less than the signal stability of the current cell, the modem performs a reselection of the serving cell from the current cell to the neighboring cell; or

105: When there are at least two neighboring cells, and the minimum signal stability value among signal stability values of the neighboring cells is less than the signal stability value of the current cell, the modem perform a reselection of the serving cell from the current cell to the neighboring cell having the minimum signal stability value.

In the prior art, neighboring cells in a network searching result are sorted using an R algorithm. Signal quality factor $R_n$ of the highest ranking neighboring cell is compared with signal quality factor $R_s$ of the current cell. When $R_s<R_n$ and the duration thereof exceeds a preset value, a cell reselection process is started, and the modem reselects the highest ranking neighboring cell from the current cell.

The signal quality factor $R_n$ of the $n^{th}$ neighboring cell is calculated by $$R_n = Q_{meas}(n) - q_{offset}(s, n) \quad (3)$$

where $Q_{meas}(n)$ is a measured signal quality value of the $n^{th}$ neighboring cell, representing the signal strength of the $n^{th}$ neighboring cell; $q_{offset}(s, n)$ is a signal quality offset value of the $n^{th}$ neighboring cell, and this parameter is acquired from a base station. In a weak field, the signal strength is low, and signal quality is poor and unstable, affecting the signal quality factor $R_n$. This results in repeated cell reselection. In the present application, the cell reselection is based on the signal stability of the current cell and the signal stability of the neighboring cell. A cell with optimum signal stability is selected for camping. Even if the signal strength and the signal quality of the current cell are not the best, as long as the signal stability of the current cell is the optimal, the cell reselection is not performed, and the current cell is camped on, thereby avoiding performing meaningless cell reselection in the weak field situation, reducing the standby power consumption of the modem, and prolonging the standby time.

Both in the case that the reselection of the serving cell is performed from the current cell to the neighboring cell, and in the case that the serving cell is made to camp on the current cell, the serving cell needs to be monitored in real time, so as to ensure that the signal stability of the serving cell is the best among neighboring cells, and even if the signal strength and the signal quality of the serving cell are not the best, cell reselection is still not performed if the signal stability is high compared to that of the neighboring cells, thereby reducing the standby power consumption of the modem.

Embodiment 2

In order for the modem to determine when to perform a cell reselection, signal strength of the current serving cell is monitored in real time. Steps of monitoring the serving cell in real time and consequent cell reselection are described in FIG. 3. The steps are performed under the following conditions: (1) after the current cell is kept as the serving cell, the neighboring cell is reselected as the serving cell, or a neighboring cell having the optimal signal stability is reselected as the serving cell; and (2) a time period during which the signal strength of the current cell is continuously lower than a preset value is longer than a time period, which is called a third time period. The duration of the third time period is relatively long, and it corresponds to a scenario in which the current cell is stably in a weak signal strength.

Figure 3:
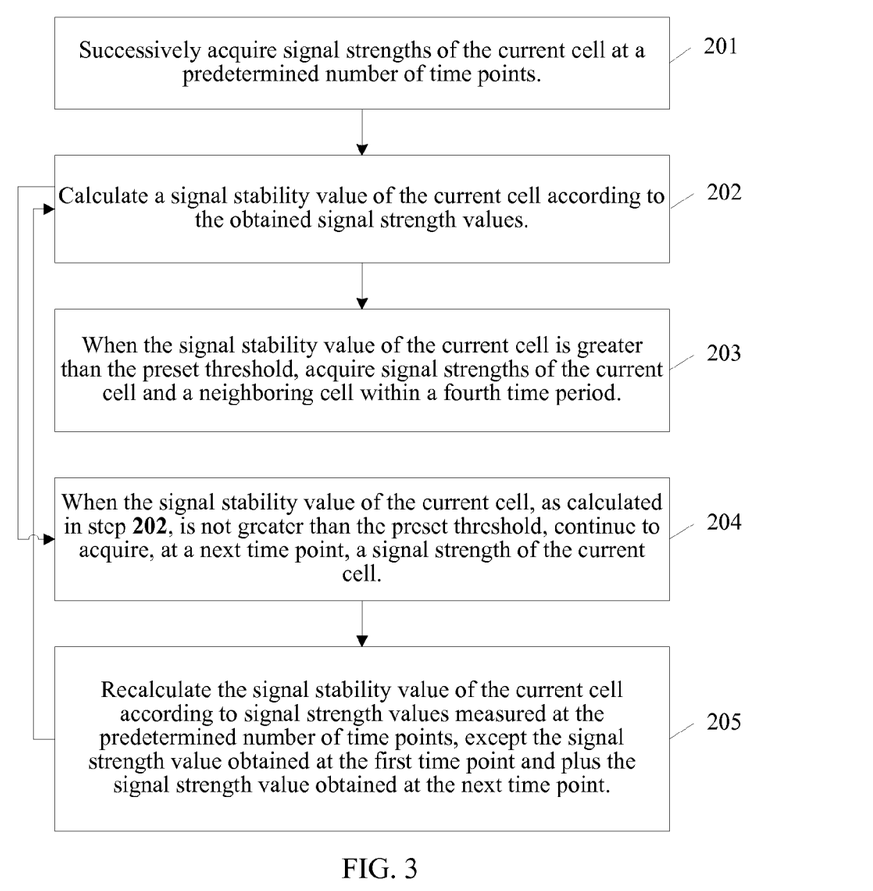
FIG. 3 is a flow chart of a method for controlling cell reselection according to Embodiment 2 of the present application.

201: Successively acquire signal strengths of the current cell at a predetermined number of time points.

Intervals between adjacent time points may be the same.

For example, the modem measures a first signal strength of the current cell at the first time point, and then after an interval of 640 ms, the modem measures a second signal strength of the current cell at the second time point, and so on. Altogether, 100 signal strength values of the current cell are acquired.

202: Calculate a signal stability value of the current cell according to the obtained signal strength values.

For example, when 100 signal strength values of the current cell are acquired, the signal stability value of the current cell is calculated according to the following equation:

$$H_{var} = \frac{\sum_{k=1}^{100} |h_k - H_{avg}|}{100} \quad (4)$$

where $H_{var}$ is the signal stability value of the current cell, $h_k$ is a signal strength value of the current cell that is acquired at the $k^{th}$ time point, and $H_{avg}$ is an average of the signal strength values of the current cell that are acquired at the 100 time points. If the signal stability value of the current cell is not greater than a preset threshold, meaning that the current cell is stable, the modem keeps monitoring the signal strength of the current cell in the manner of steps 201 and 202, without performing cell reselection. This is further described in steps 204 and 205 below.

203: When the signal stability value of the current cell is greater than the preset threshold, acquire signal strengths of the current cell and a neighboring cell within a fourth time period.

The fourth time period is a time period after the signal strength of the current cell has been measured at the predetermined number of time points, and the measurement performed in the fourth time period is independent of the measurements performed previously.

The signal stability value of the current cell is determined according to the signal strength values of the current cell, and the signal stability value of the neighboring cell is determined according to the signal strength values of the neighboring cell.

Specifically, the signal stability value of the current cell is calculated according to the following equation:

$$Y = \frac{\sum_{m=1}^{M} |y_m - Y_a|}{M} \quad (5)$$

where Y is the signal stability value of the current cell, $y_m$ is a signal strength value of the current cell that is acquired at the $m^{th}$ time point within the fourth time period, $Y_a$ is an average of signal strength values of the current cell that are acquired at M time points within the fourth time period, and M is the number of times when the signal strength values of the current cell is acquired within the fourth time period.

The signal stability value of the neighboring cell is calculated according to the following equation:

$$G = \frac{\sum_{m=1}^{M} |g_m - G_a|}{M} \quad (6)$$

where G is the signal stability value of the neighboring cell, $g_m$ is a signal strength value of the neighboring cell that is acquired at the $m^{th}$ time point within the fourth time period, $G_a$ is an average of signal strength values of the neighboring cell that are acquired at M time points within the fourth time period, and M is the number of times when the signal strength of the neighboring cell is acquired within the fourth time period.

The determined signal stability value of the current cell is compared with the determined signal stability value of the neighboring cell.

When there is only one neighboring cell, the current cell is camped on when the signal stability value of the neighboring cell is not less than the signal stability value of the current cell, or the serving cell is reselected to be the neighboring cell when the signal stability value of the neighboring cell is less than the signal stability value of the current cell.

When there are two or more neighboring cells, the current cell is camped on when minimum signal stability value among signal stability values of the neighboring cells is not less than the signal stability value of the current cell, or the serving cell is reselected to be a neighboring cell corresponding to a minimum signal stability value when the minimum signal stability value among signal stability values of the neighboring cells is less than the signal stability value of the current cell.

Both in the case of camping on the current cell, and in the case of reselecting the neighboring cell as the serving cell, the current serving cell needs to be monitored in real time, so as to ensure that the signal stability of the current serving cell is always the best.

204: When the signal stability value of the current cell, as calculated in step 202, is not greater than the preset threshold, continue to acquire, at a next time point, a signal strength of the current cell.

205: Recalculate the signal stability value of the current cell according to signal strength values measured at the predetermined number of time points as in step 201, except the signal strength value obtained at the first time point and plus the signal strength value obtained at the next time point as in step 204.

When the signal stability value is not greater than the preset threshold, indicating that the current cell is still in stability condition within the preset threshold, the modem continues to monitor the current cell by acquiring the signal strength of the current cell. For example, a $101^{th}$ signal strength of the current cell at the $101^{th}$ time point is acquired, and the signal stability value of the current cell is calculated according to the following equation:

$$H'_{var} = \frac{\sum_{k=2}^{101} |h_k - H'_{avg}|}{100} \qquad (7)$$

where $H'_{var}$ is the signal stability value of the current cell, $h_k$ is a signal strength value of the current cell acquired at the $k^{th}$ time point, the $k^{th}$ time point is any time point from the second time point to a $101^{th}$ time point, and $H'_{avg}$ is an average of signal strength values of the current cell that are acquired at 100 time points.

The signal stability value of the current cell $H'_{var}$ obtained through the recalculation is compared with the preset threshold, so as to determine whether to acquire the signal strengths of the current cell and the neighboring cell (step 203) or continue to monitor the signal strength of the current cell (step 204).

It is well known by persons skilled in the cellular communication art that a cell is normally surrounded by one or more neighboring cells, and a modem is capable of acquiring signals from the neighboring cells, in addition to that of the current serving cell. Specifically, when the signal stability value of the neighboring cell is not less than the signal stability value of the current cell, the modem's maintaining the current cell as the serving cell includes the following:

if there is only one neighboring cell of which the signal strength is acquired, and when the signal stability value of the neighboring cell is not less than the signal stability value of the current cell, maintaining the current cell as the serving cell; or if there are more than one neighboring cells of which the signal strengths are acquired, and a minimum signal stability value among signal stability values of the neighboring cells is not less than the signal stability value of the current cell, maintaining the current cell as the serving cell.

On the other hand, the modem's reselecting of the neighboring cell as the serving cell includes the following:

if there is only one neighboring cell of which the signal strength is acquired, and when the signal stability value of the neighboring cell is less than the signal stability value of the current cell, reselecting the neighboring cell as the serving cell; or if there are more than one neighboring cells of which the signal strengths are acquired, and when the minimum signal stability value among signal stability values of the neighboring cells is less than the signal stability value of the current cell, reselecting the neighboring cell corresponding to the minimum signal stability value as the serving cell.

In the prior art, a modem obtains, through calculation, a signal quality factor and a signal power factor of the serving cell by using an S algorithm. When a value of any one of the two factors reaches a co-frequency measurement threshold, an inter-frequency measurement threshold, or an inter-system measurement threshold, the modem starts a network searching measurement in a corresponding scope. In the weak field, the signal strength is weak, and the signal quality is poor and unstable, which affects the signal quality factor and the signal power factor of the serving cell, so that the modem starts network searching. In the present application, only the signal stability of the serving cell is monitored, and no matter whether the signal quality factor and the signal power factor of the serving cell reach the measurement threshold, as long as the signal stability value of the serving cell is not greater than the preset threshold, the serving cell continues to be camped on, the serving cell continues to be monitored, and network searching is not started, thereby avoiding performing meaningless network searching in the weak field situation, reducing the standby power consumption of the modem, and prolonging the standby time.

A stability state of the serving cell may be obtained in time through the foregoing method, so as to ensure that the stability of the serving cell where the modem is located is the optimal in the weak field.

Embodiment 3

Figure 4:
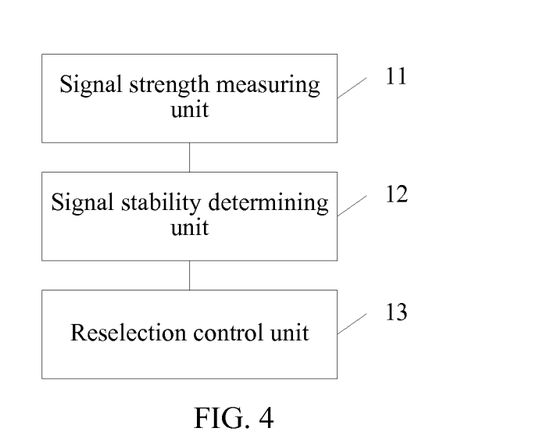
FIG. 4 is a simplified block diagram of an apparatus for controlling cell reselection according to Embodiment 3 of the present application.

Corresponding to the above embodiments of the present application, an apparatus for controlling cell reselection is shown, in terms of functional units, in FIG. 4, and it includes a signal strength measuring unit 11, a signal stability determining unit 12, and a cell reselection control unit 13.

The signal strength measuring unit 11 is configured to measure signal strength of the current cell, and when the signal strength of the current cell is lower than a set value for longer than a first time period, acquire signal strengths of the current cell and a neighboring cell within a second time period.

The signal stability determining unit 12 is configured to determine signal stability of the current cell according to the signal strength of the current cell, and determine signal stability of the neighboring cell according to the signal strength of the neighboring cell.

The cell reselection control unit 13 is configured to select the neighboring cell as the serving cell if the signal stability of the neighboring cell is better than the signal stability of the current cell.

The first time period may be a short time period after the time of the signal strength of the current cell being lower than the set value, so that the embodiment corresponds to a scenario in which the current cell is switched from a strong signal strength to a weak signal strength which is lower than the set value.

In the apparatus for controlling cell reselection provided in this embodiment of the present application, when the signal strength of the current cell is lower than the set value for a time period that exceeds the set time period, the signal strength measuring unit 11 acquires the signal strength values of the current cell and the neighboring cell within the second set time period, the signal stability determining unit 12 obtains a signal stability value of the current cell and a signal stability value of the neighboring cell, and the cell reselection control unit 13 maintains the current cell as the serving cell when the signal stability value of the neighboring cell is not less than the signal stability value of the current cell. By implementing the solutions presented in this embodiment of the present application, a problem in the prior art that, in a weak field situation, due to the signal instability in the weak field, the modem needs to continuously perform cell reselection, which increases the standby power consumption and shortens the standby time of the modem, may be overcome, thereby implementing that the modem camps on a most stable serving cell in the weak field situation, avoiding performing meaningless cell reselection, reducing the standby power consumption of the modem, and prolonging the standby time.

In determining the signal stability value of the current cell, the signal stability determining unit 12 is configured to:

determine the signal stability value of the current cell according to the following equation:

$$Q'_{var} = \frac{\sum_{n=1}^{N} |q_n - Q_{avg}|}{N} \quad (8)$$

where $Q'_{var}$ is the signal stability value of the current cell, $q_n$ is a signal strength value of the current cell that is acquired at the $n^{th}$ time point within the second time period, $Q_{avg}$ is an average of signal strength values of the current cell that are acquired at N time points within the second time period, and N is the number of times when the signal strength of the current cell is acquired within the second time period.

In determining the signal stability value of the neighboring cell, the signal stability determining unit 12 is configured to:

determine the signal stability value of the neighboring cell according to the following equation:

$$Q_r = \frac{\sum_{n=1}^{N} |w_n - Q_a|}{N} \quad (9)$$

where $Q_r$ is the signal stability value of the neighboring cell, $w_n$ is a signal strength value of the neighboring cell that is acquired at the $n^{th}$ time point within the second time period, $Q_a$ is an average of signal strength values of the neighboring cell that are acquired at N time points within the second time period, and N is the number of times when the signal strength of the neighboring cell is acquired within the second time period.

It is well known by persons skilled in the cellular communication art that a cell is normally surrounded by one or more neighboring cells, and the signal strength measuring unit 11 is capable of acquiring signal strengths of the neighboring cells, in addition to that of the current cell. If there is only one neighboring cell of which the signal strength is acquired, and when the signal stability value of the neighboring cell is not less than the signal stability value of the current cell, the cell reselection control unit 13 is configured to maintain the current cell as the serving cell; if there are more than one neighboring cells of which the signal strengths are acquired, and when a minimum signal stability value among signal stability values of the neighboring cells is not less than the signal stability value of the current cell, the cell reselection control unit 13 is configured to maintain the current cell as the serving cell.

Also, if there is only one neighboring cell of which the signal strength is acquired, and when the signal stability value of the neighboring cell is less than the signal stability value of the current cell, the cell reselection control unit 13 is configured to reselect the neighboring cell as the serving cell; if there are more than one neighboring cells of which the signal strengths are acquired, and when the minimum signal stability value among signal stability values of the neighboring cells is less than the signal stability value of the current cell, the cell resection unit 13 is configured to reselect the neighboring cell corresponding to the minimum signal stability value as the serving cell.

The following units are applied in one of the following scenarios: (1) after the serving cell is made to camp on the current cell, or (2) reselection of the serving cell is performed from the current cell to the neighboring cell, or (3) reselection of the serving cell is performed from the current cell to a neighboring cell corresponding to the minimum signal stability value. The time period starting from when the signal strength of the current cell is lower than the set value exceeds a third time period. The third time period is a time period during which the signal strength of the current cell continuously being lower than the set value, and the time period is usually relatively long and corresponds to a scenario in which the current cell is stably in a weak signal strength.

The signal strength measuring unit is further configured to successively acquire signal strengths of the current cell at a predetermined number of time points.

The signal stability determining unit is further configured to calculate a signal stability value of the current cell according to the obtained predetermined number of signal strengths.

The signal strength measuring unit is further configured to, when the signal stability value of the current cell is greater than a preset threshold, acquire signal strengths of the current cell and the neighboring cell within a fourth set time.

The signal strength measuring unit is further configured to, when the signal stability value of the current cell is not greater than the preset threshold, acquire, at a next time point, a signal strength of the current cell.

The signal stability determining unit is further configured to recalculate the signal stability value of the current cell according to all signal strength values other than a signal strength value obtained at a first time point among the predetermined number of signal strengths, and according to the signal strength value obtained at the next time point.

The signal stability determining unit is further configured to determine the signal stability value of the current cell according to the signal strength of the current cell, and determine the signal stability value of the neighboring cell according to the signal strength of the neighboring cell.

The reselection control unit is further configured to, when there is only one neighboring cell, camp on the current cell when the signal stability value of the neighboring cell is not less than the signal stability value of the current cell, or reselect the serving cell to be the neighboring cell when the signal stability value of the neighboring cell is less than the signal stability value of the current cell; or when there are at least two neighboring cells, camp on the current cell when a minimum signal stability value among signal stability values of the neighboring cells is not less than the signal stability value of the current cell, or reselect the serving cell to be a neighboring cell corresponding to the minimum signal stability value when the minimum signal stability value among signal stability values of the neighboring cells is less than the signal stability value of the current cell.

Embodiment 4

Figure 5:
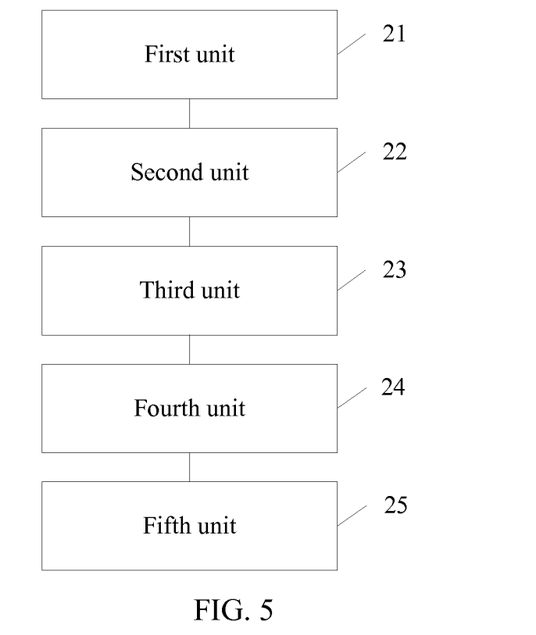
FIG. 5 is a simplified block diagram of an apparatus for controlling cell reselection according to Embodiment 4 of the present application.

An apparatus for controlling cell reselection provided in an embodiment of the present application is shown in FIG. 5, and includes a first unit 21, a second unit 22, a third unit 23, a fourth unit 24, and a fifth unit 25, where the first unit 21 is configured to, when a time period during which a signal strength of a current cell is lower than a set value exceeds a third time period, successively acquire signal strength values of the current cell at a predetermined time points;

the second unit 22 is configured to calculate a signal stability value of the current cell according to the obtained predetermined number of signal strength values;

the third unit 23 is configured to, when the signal stability value is greater than a preset threshold, acquire signal strength values of the current cell and the neighboring cell within a fourth time period;

the fourth unit 24 is configured to determine signal stability value of the current cell according to the signal strength values of the current cell, and determine signal stability value of the neighboring cell according to the signal strength values of the neighboring cell; and the fifth unit 25 is configured to maintain the current cell as the serving cell when the signal stability value of the neighboring cell is not less than the signal stability value of the current cell.

In addition, the apparatus of the embodiment further includes:

a sixth unit, configured to, when the signal stability value is not greater than the preset threshold, acquire, at a next time point, a signal strength of the current cell; and a seventh unit, configured to perform a step of calculating the signal stability value of the current cell according to all signal strengths other than a signal strength value obtained at a first time point among the predetermined number of signal strength values, and according to the signal strength value obtained at the next time point.

Specifically, the fifth unit 25 includes:

an eighth unit, configured to camp on the current cell when the number of neighboring cells is one, and when the signal stability value of the neighboring cell is not less than the signal stability value of the current cell; and a ninth unit, configured to camp on the current cell when the number of neighboring cells is at least two, and when a minimum signal stability value among signal stability values of the neighboring cells is not less than the signal stability value of the current cell.

The apparatus of the embodiment further includes:

a tenth unit, configured to reselect the serving cell to be the neighboring cell when the number of neighboring cells is one, and when the signal stability value of the neighboring cell is less than the signal stability value of the current cell; and an eleventh unit, configured to reselect the serving cell to be a neighboring cell corresponding to a minimum signal stability value when the number of neighboring cells is at least two, and when the minimum signal stability value among signal stability values of the neighboring cells is less than the signal stability value of the current cell.

The apparatus may be a modem, or the apparatus may be a communication device having a modem, such as a mobile phone, a data card, or a tablet computer.

For an operation process of the apparatus, reference is made to the implementation processes of the foregoing cell reselection method. In the apparatus embodiments, the terms same as those in the method embodiments have the same meaning Persons of ordinary skill in the art should understand that all or a part of the steps of the method according to the embodiments of the present application may be implemented by a program instructing relevant hardware. The program may be stored in a computer readable storage medium. When the program is run, the steps of the method according to the embodiments of the present application are performed. The storage medium may be any medium that is capable of storing program codes, such as a ROM, a RAM, a magnetic disk, or an optical disk.

The foregoing descriptions are merely several embodiments of the present application, but not intended to limit the present application. Various variations and modifications that can be easily thought of by persons skilled in the art within the technical scope of the present application fall within the scope of the present application. Therefore, the protection scope of the present application is subject to the appended claims.

What is claimed is:

1. A method for controlling cell reselection in a cellular communication network, comprising:

monitoring, by a communication device, signal strength of a current serving cell;

when the signal strength of the current serving cell has been lower than a threshold value for longer than a first time period, successively acquiring, by the communication device, signal strengths of the current serving cell and at least one neighboring cell within a second time period for a predetermined number of times;

determining, by the communication device, signal stability of the current serving cell according to the signal strength of the current serving cell, and signal stability of the neighboring cell according to the signal strength of the neighboring cell; and when the signal stability of the neighboring cell is better than the signal stability of the current serving cell, reselecting, by the communication device, the neighboring cell as a serving cell;

wherein the signal stability is represented by a signal stability value, the signal strength is represented by a signal strength value, and the signal stability value is a variance value of the signal strength value, and wherein the signal stability of the current serving cell is represented by the signal stability value of the current serving cell, and the signal stability value of the current serving cell is calculated according to:

$$Q'_{var} = \frac{\sum_{n=1}^{N} |q_n - Q_{avg}|}{N}$$

wherein $Q'_{var}$ is the signal stability value of the current serving cell, $q_n$ is a signal strength value of the current serving cell that is acquired at the $n^{th}$ time point within the second time period, $Q_{avg}$ is an average value of the signal strength values of the current serving cell that are acquired at N time points within the second time period, N is the number of times when the signal strength of the current serving cell is acquired within the second time period, and N is greater than or equal to 2.

2. The method according to claim 1, wherein the signal stability of the neighboring cell is represented by the signal stability value of the neighboring cell, and the signal stability value of the neighboring cell is calculated according to:

$$Q_r = \frac{\sum_{n=1}^{N} |w_n - Q_a|}{N}$$

wherein $Q_r$ is the signal stability value of the neighboring cell, $w_n$ is a signal strength value of the neighboring cell that is acquired at the $n^{th}$ time point within the second time period, $Q_a$ is an average value of the signal strength values of the neighboring cell that are acquired at N time points within the second time period, and N is the number of times when the signal strength of the neighboring cell is acquired within the second time period, and N is greater than or equal to 2.

3. The method according to claim 1, wherein if the signal stability of the neighboring cell is not better than the signal stability of the current serving cell, the communication device remains to be served by the current serving cell.

4. The method according to claim 3, wherein after the communication device reselects the neighboring cell as the serving cell or after the communication device remains to be served by the current serving cell, the method further comprises:
   successively acquiring, by the communication device, signal strengths of the current serving cell for a predetermined number of times in a third time period;
   calculating signal stability of the current serving cell according to the signal strengths obtained in the third time period;
   if the signal stability of the current serving cell is not better than a preset threshold, acquiring signal strengths of the current serving cell and the neighboring cell within a fourth time period; or
   if the signal stability of the current serving cell is better than the preset threshold, acquiring, at a next time point, a signal strength of the current serving cell and calculating the signal stability of the current serving cell according to signal strengths obtained at the predetermined number of times and the next time point, except the signal strength obtained at the first time point.

5. The method according to claim 4, wherein after acquiring the signal strengths of the current serving cell and the neighboring cell within the fourth time period when the signal stability of the current serving cell is not better than the preset threshold, the method further comprises:
   determining signal stability of the current serving cell according to the signal strength of the current serving cell, and determining signal stability of the neighboring cell according to the signal strength of the neighboring cell; and
   staying on the current serving cell when the signal stability of the neighboring cell is not better than the signal stability of the current serving cell, or reselecting the serving cell to be the neighboring cell when the signal stability of the neighboring cell is better than the signal stability of the current serving cell.

6. The method according to claim 4, wherein there are two or more neighboring cells of which the signal strengths are acquired and the signal stabilities are determined by the communication device, wherein after acquiring the signal strengths of the current serving cell and the two or more neighboring cells within the fourth time period when the signal stability of the current serving cell is not better than the preset threshold, the method further comprises:
   determining signal stability of the current serving cell according to the signal strength of the current serving cell, and determining signal stabilities of the neighboring cells according to signal strengths of the neighboring cells; and
   staying on the current serving cell when the best signal stability among signal stabilities of the neighboring cells is not better than the signal stability of the current serving cell; or reselecting the serving cell to be a neighboring cell corresponding to the best stability when at least one signal stability among signal stabilities of the neighboring cells is better than the signal stability of the serving cell.

7. The method according to claim 1, wherein there are two or more neighboring cells of which the signal strengths are acquired and the signal stabilities are determined by the communication device, if the signal stability of at least one neighboring cell is better than the signal stability of the current serving cell, the communication device reselects the neighboring cell having the best signal stability as the serving cell.

8. The method according to claim 1, wherein there are two or more neighboring cells of which the signal strengths are acquired and the signal stabilities are determined by the communication device, if the best signal stability of at least one neighboring cell is not better than the signal stability of the current serving cell, the communication device remains to be served by the current serving cell.

9. The method according to claim 1, wherein monitoring, by the communication device, the signal strength of the current serving cell comprises:
   measuring, by the communication device, the signal strength of the current serving cell repeatedly at a predetermined time interval.

10. An apparatus for controlling cell reselection in a cellular communication network, comprising processing circuitries configured to execute program instructions stored in a non-transitory medium, wherein the instructions comprise:
    a signal strength measuring unit, for monitoring signal strength of a current serving cell, and, when signal strength of the current serving cell is lower than a threshold value for longer than a first time period, successively acquiring signal strengths of the current serving cell and at least one neighboring cell within a second time period for a predetermined number of times;
    a signal stability determining unit, for determining signal stability of the current serving cell according to the signal strength of the current serving cell, and determine signal stability of the neighboring cell according to the signal strength of the neighboring cell; and
    a cell reselection control unit, for reselecting the neighboring cell as a serving cell when the signal stability of the neighboring cell is better than the signal stability of the current serving cell;
    wherein the signal stability is represented by a signal stability value, the signal strength is represented by a signal strength value, and the signal stability value is a variance value of the signal strength value, and wherein the signal stability of the current serving cell is represented by the signal stability value of the current serving cell, and the signal stability value of the current serving cell is calculated according to:

$$Q'_{var} = \frac{\sum_{n=1}^{N} |q_n - Q_{avg}|}{N}$$

wherein $Q'_{var}$ is the signal stability value of the current serving cell, $q_n$ is a signal strength value of the current serving cell that is acquired at the $n^{th}$ time point within the second time period, $Q_{avg}$ is an average value of the signal strength values of the current serving cell that are acquired at N time points within the second time period, and N is the number of times when the signal strength of the current serving cell is acquired within the second time period.

11. The apparatus according to claim 10, wherein the signal stability of the neighboring cell is represented by the signal stability value of the neighboring cell, and the signal stability value of the neighboring cell is calculated according to:

$$Q_r = \frac{\sum_{n=1}^{N} |w_n - Q_a|}{N}$$

wherein $Q_r$ is the signal stability value of the neighboring cell, $w_n$ is a signal strength value of the neighboring cell that is acquired at the $n^{th}$ time point within the second time period, $Q_a$ is an average value of signal strengths values of the neighboring cell that are acquired at N time points within the second time period, and N is the number of times when the signal strength of the neighboring cell is acquired within the second time period, and N is greater than or equal to 2.

12. The apparatus according to claim 10, wherein if the signal stability of the neighboring cell is not better than the signal stability of the current serving cell, the apparatus remains to be served by the current serving cell.

13. The apparatus according to claim 10, wherein there are two or more neighboring cells of which the signal strengths are acquired and the signal stabilities are determined by the signal stability determining unit, if the signal stability of at least one neighboring cell is better than the signal stability of the current serving cell, the neighboring cell having the best signal stability is reselected as the serving cell.

14. The apparatus according to claim 10, wherein there are two or more neighboring cells of which the signal strengths are acquired and the signal stabilities are determined, if the best signal stability of at least one neighboring cell is not better than the signal stability of the current serving cell, the apparatus remains to be served by the current serving cell.

15. The apparatus according to claim 10, wherein the apparatus is a modem.

16. The apparatus according to claim 10, wherein the apparatus is a terminal device having a modem.

17. An apparatus for controlling cell reselection in a cellular communication network, comprising processing circuitries configured to execute program instructions stored in a non-transitory medium, wherein the instructions comprise:
  instructions for monitoring signal strength of a current serving cell, and, when signal strength of the current serving cell is lower than a threshold value for longer than a first time period, acquiring signal strengths of the current serving cell and at least one neighboring cell in a second time period;
  instructions for determining signal stability of the current serving cell according to the signal strength of the current serving cell, and determining signal stability of the neighboring cell according to the signal strength of the neighboring cell;
  instructions for reselecting the neighboring cell as a serving cell when the signal stability of the neighboring cell is better than the signal stability of the current serving cell;

wherein after reselecting the serving cell or after the apparatus remains to be served by the current serving cell, the processing circuitries are further configured to execute instructions for:
  successively acquiring signal strengths of the current serving cell at a predetermined number of times;
  calculating signal stability of the current serving cell according to the signal strengths obtained at a predetermined number of times;
  when the signal stability is greater than a preset threshold, acquiring signal strengths of the current serving cell and the neighboring cell within a fourth time period;
  when the signal stability is not greater than the preset threshold, acquiring, at a next time point, signal strength of the current serving cell; and
  recalculating the signal stability of the current serving cell according to signal strengths obtained at the predetermined number of times and the next time point, except the signal strength obtained at the first time point,
  wherein the signal stability is represented by a signal stability value, the signal strength is represented by a signal strength value, and the signal stability value is a variance value of the signal strength value.

18. A terminal device capable of communicating with a cellular communication network, comprising an apparatus for selecting a serving cell, wherein the apparatus comprises:
  a signal monitor, configured to monitor signal strength of a current serving cell, and, when the signal strength of the current serving cell is lower than a threshold value for longer than a first time period, successively acquire signal strengths of the current serving cell and at least one neighboring cell within a second time period for a predetermined number of times; and
  a signal processor, configured to determine signal stability of the current serving cell and signal stability of the neighboring cell according, respectively, to the signal strength of the current serving cell and the signal strength of the neighboring cell, and reselect the neighboring cell as a serving cell when the signal stability of the neighboring cell is better than the signal stability of the current serving cell;
  wherein the signal stability is represented by a signal stability value, the signal strength is represented by a signal strength value, and the signal stability value is a variance value of the signal strength value, and wherein the signal stability of the current serving cell is represented by the signal stability value of the current serving cell, and the signal stability value of the current serving cell is calculated according to:

$$Q'_{var} = \frac{\sum_{n=1}^{N} |q_n - Q_{avg}|}{N}$$

wherein $Q'_{var}$ is the signal stability value of the current serving cell, $q_n$ is a signal strength value of the current serving cell that is acquired at the $n^{th}$ time point within the second time period, $Q_{avg}$ is an average value of the signal strength values of the current serving cell that are acquired at N time points within the second time period, N is the number of times when the signal strength of the current serving cell is acquired within the second time period, and N is greater than or equal to 2.

19. The terminal device according to claim 18, wherein if the signal stability of the neighboring cell is not better than the signal stability of the current serving cell, the terminal device remains to be served by the current serving cell.

20. The terminal device according to claim 18, wherein there are two or more neighboring cells of which the signal strengths are acquired and the signal stabilities are determined by the terminal device, if the signal stability of at least one neighboring cell is better than the signal stability of the current serving cell, the terminal device reselects the neighboring cell having the best signal stability as the serving cell.

21. The terminal device according to claim 18, wherein there are two or more neighboring cells of which the signal strengths are acquired and the signal stabilities are determined by the terminal device, if the best signal stability of at least one neighboring cell is not better than the signal stability of the current serving cell, the terminal device remains to be served by the current serving cell.

22. The terminal device according to claim 18, wherein the apparatus is a modem.

23. The terminal device according to claim 18, wherein the signal stability of the neighboring cell is represented by the signal stability value of the neighboring cell, and the signal stability value of the neighboring cell is calculated according to:

$$Q_r = \frac{\sum_{n=1}^{N} |w_n - Q_a|}{N}$$

wherein $Q_r$ is the signal stability value of the neighboring cell, $w_n$ is a signal strength value of the neighboring cell that is acquired at the $n^{th}$ time point within the second time period, $Q_a$ is an average value of signal strengths values of the neighboring cell that are acquired at N time points within the second time period, and N is the number of times when the signal strength of the neighboring cell is acquired within the second time period, and N is greater than or equal to 2.

* * * * *